(12) United States Patent
Licon et al.

(10) Patent No.: US 6,728,705 B2
(45) Date of Patent: Apr. 27, 2004

(54) SYSTEM AND METHOD FOR SELECTING CONTENT FOR DISPLAYING OVER THE INTERNET BASED UPON SOME USER INPUT

(75) Inventors: Roberto Licon, El Paso, TX (US); Andrew Bensky, Scotts Valley, CA (US); Erik Swan, Palo Alto, CA (US); Paul Ingram, Pleasanton, CA (US); Naga Pappireddi, San Jose, CA (US); Michael D. Fox, San Jose, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/946,061

(22) Filed: Sep. 4, 2001

(65) Prior Publication Data
US 2003/0035000 A1 Feb. 20, 2003

Related U.S. Application Data
(60) Provisional application No. 60/229,779, filed on Sep. 1, 2000.

(51) Int. Cl.$^7$ .............................................. G06F 17/30
(52) U.S. Cl. ................................. 707/3; 707/4; 707/10; 707/104.1; 709/217; 709/219; 709/203; 715/501.1; 715/513
(58) Field of Search .............................. 707/3, 5, 2, 10, 707/102, 104.1, 4, 6, 103 R; 709/218, 219, 206, 225, 217; 715/500, 513, 501.1; 345/747

(56) References Cited

U.S. PATENT DOCUMENTS

| | | | | | |
|---|---|---|---|---|---|
| 5,890,172 | A | * | 3/1999 | Borman et al. | 707/501 |
| 6,112,203 | A | * | 8/2000 | Bharat et al. | 707/5 |
| 6,311,194 | B1 | * | 10/2001 | Sheth et al. | 707/505 |
| 6,327,628 | B1 | * | 12/2001 | Anuff et al. | 709/311 |
| 6,446,065 | B1 | * | 9/2002 | Nishioka et al. | 707/5 |
| 6,457,004 | B1 | * | 9/2002 | Nishioka et al. | 707/5 |
| 2001/0037359 | A1 | * | 11/2001 | Mockett et al. | 709/203 |

* cited by examiner

*Primary Examiner*—Charles Rones
*Assistant Examiner*—Jacques Veillard
(74) *Attorney, Agent, or Firm*—Greenberg Traurig LLP; Margo Maddux; Donald L. Wenskay, Esq.

(57) ABSTRACT

The present invention provides a method for displaying information from the Internet. In one embodiment, the invention generates a plurality of content modules, each content module comprising a subset of the content of at least one web site. The content modules are then stored in a content module data directory. When a query is received from a user, the query is assigned to at least one content module. The results of the query are displayed on two regions of the user's screen. On a first region of the user's display screen a list of information relating to the plurality of retrieved web sites is displayed. On a second region of said display screen, information from said at least one content module associated with the query is displayed.

8 Claims, 21 Drawing Sheets

FIG. 3-A

☐ Go to MyPage  Sign Out  Privacy/Saf

SEARCH ⦿All ○Images ○Audio/Video

[Britney Spears]

[GO]  ⦿New Search  ○Within Results           Sea
                                              GOgu Go Back-To-School!
Who's who on Mr. Showbiz!

GO DIRECTORY

Search>Entertainment>Music>Artists &
bands>S>Spears, Britney

Artist Bios by Wall of Sound

Britney Spears BRITNEY
JEAN SPEARS was born
Dec. 2, 1981, in....

More by
PicturesNow

Albums

News Today: Tuesday
August 29,2000
Christina, Sisqo to Play
Video Music Awards

More on Britney Spears

☐ USER RATED SITES 35 matches   Powered by sort by:

☐ Britney Spears Fan Club
Touring schedule, photo gallery, discography, lyrics,
Webrings, links and chat.
Last reviewed by VolkertV
http://www.britneyspearsfan.com/

☐ Britney Spears: Official Website
Official Britney Spears homepage offering images,
electronic postcards, merchandise and more.
Last reviewed by jhawkins2000
http://www.britneyspears.com/

Got Milk?

Don't give it to your
Cats are sensitive critters
who need a balanced and
healthy diet. Don't kill
with kindness!

[ S ]

milk can cause
digestive
problems in cats

Album Reviews by Wall of Sound

Britney Spears
Oops!...I Did It Again
Jive

☐ Britney Zone
Offers photgraphs, audio and videos. Also has news,
contests, forum, games, and chat.
Last reviewed by pwnorm
http://www.britneyzone.com/

FIG. 3-B

☐ 001Pic.com: Britney Spears ☐☐☐
Offers pictures, audio and videos. Also has Britney
puzzle games, screen saver, and britney web popularity
info.
Last reviewed by jerryman44
http://www.001pic.com/BritneySpears/
☐ Adorable Britney Spears ☐☐
Britney Spears biography, discography, lyrics, pictures
galleries and links to other Britney sites.
Last reviewed by sthenbelle05
http://www.britney-spears.nm.ru/

The message here is not
subtle nor hard to disconnect
her...

Req

☐ WEB SEARCH RESULTS ☒

26,388 matches    Powered by [    ]
Hide summaries | Sort by date | Ungroup results Next 10>

☒

Save up to 70%!
• Big Deal of the Day
• Electronics
• Bargaineers Club

Audio/Video from Listen.com
Britney Spears
Already a pop singer of fabled proportions
teen queen of the marketing tie-in, Britney
was groomed for pop st ☐ Britney Spears-Go there directly with this Internet
Keyword by RealNames.
1. Peeps.com: Britney Spears
Official site has Britney's biography, photos, interview in
audio or video, and fan club info.
Relevance 93% Date 28 Jul 1999, Size 1.6K
http://www.peeps.com/britney/
Find similar pages | More results | Translate this page 2. Britney Spears Organization
Stylish site pays tribute to Spears with a biography, a
message board, a discography, a fan club, and more.
Relevance 92% Date 22 Oct 1999, Size 7.2K
http://www.britneyspears.org/
Find similar pages | Translate this page 3. Wall of Sound: Britney Spears
Biography, discongraphy, CD review and news.
Relevance 90% Date 6 Oct 1999, Size 15.4K
http://wallofsound.go.com/artists/britneyspears/h...
Find similar pages | Translate this page GO Shopping
Shop for what you want!
• Search for britney spears
• Shop by Product
• Utilize the Buyer's Guides
• See Merchant Ratings
• Use GO Shopping's Advance Search Look in GO S 4. Britney Spears: The Official Britney Spears Website
The Official Britney Spears Website provides extensive information about the teen music sensation, from her southern belle upbringing in Louisiana, to her days as a chipper Mouseketeer and her current...
Relevance 87% Date 13 Aug 1999, Size 10.6K
http://www.officialbritney.com/
Find similar pages | Translate this page 5. Britney Spears Fan.com
Touring schedule, photo gallery, discography, lyrics, Webrings, links and chat.
Relevance 86% Date 9 Sep 1999, Size 14.5K
http://www.britneyspearsfan.com/
Find similar pages | Translate this page

Next 10>

Check Out the GO Shop

| GO.com Partners: | ABC.com ABCNEWS.com | Disney.com ESPN.com | Family.com Movies.com | Mr. Showbiz Wall of Sound |

GO.com Information: Add a URL About Our Company Jobs Write to Us
GO.com Affiliate Terms of Service
Copyright © 2000 The Walt Disney Company, GO.com. All Rights Reserved.

☐ SEARCH ●All ○Images ○Audio/Video     ☐ Go to MyPage  Sign Out  Privacy/Saf
[Bridge on the River Kwai,                    ]    ●New Search
                                              [GO]  ○Within Results All sports, all the time!    Click on the 33 for a chance to win $1,000,000
Wanna be a Millionaire?     ( 33 )( 88 )( 16 )( 78 )( 52 )( 9 )

GO DIRECTORY                                    Movie Spotlight, from Mr. Showbiz
GO Home>Entertainment>Movies>By
title>B>Bridge on the River Kwai, The           [☒] The Bridge on the River
                                                    Kwai
PROVEN PICKS                                        1957
                                                    Stars: Read review
[☒] The Bridge on                                   Director:
    the...
                                                    Summary: An engro
11 matches  Powered by [        ] :users like       action-adventure story
you                                                                     Read

☐ Classic Movies: Bridge Over the River Kwai
Movie poster, awards, cast and crew information,
reviews, moments and scenes, multimedia, photo and   Find Movie Times, from Movies.com
poster gallery.
Last reviewed by: SurfLean                           When's the movie start? Check times by typ
http://www.geocities.com/Hollywood/9766/kwai.html    movie name and your zip code.

☐ ApolloGuide: Bridge Over the River Kwai            Movie Names        [                    ]
Summary, review, links, movie matches, actor credits,
director and trailer links.                          Your Zip Code (or City, State)
Last reviewed by: SurfLearn                                             [                    ]
http://apolloguide.com/mov_revtemp.asp?Title=Bridg...

☐ BritMovie: Bridge Over the River Kwai
Production team, cast, plot synopsis and filming tidbits
about the classic war epic.
Last reviewed by: SurfLearn
http://www.britmovie.co.uk/directors/d_lean/filmog...

FIG. 5-B

☐ Hartwick.edu: Bridge Over the River Kwai
Film poster with Hartwick Classic Film Leadership
Case study based on the film, which is based on Pierre
Boulle's novel.
Last reviewed by: SurfLearn
http://www.hartwick.edu/hhmi/cases/riverkwai.htm ☐ At-A-Glance: Bridge Over the River Kwai
Sam and Dean discuss aspects of the film and other
reviews of it.
Last reviewed by: SurfLearn
http://www.rinkworks.com/movies/m/the.bridge.in.th...

Next 6>

Become a GO Guide to help us build a better directory.
☐ WEB SEARCH RESULTS  ☒

31,075,903 matches Powered by [        ]

Show details | Sort by date | Ungroup results
GO.com: Your Page for "Bridge on the River Kwai, The"

1. Farmingon Library
Farmington Library
http://connect.crlc.org:1092/

2. The Flick Filosopher | The Bridge on the River
Kwai
Instantly one of my favorite films, The Bridge on the
River Kwai is a tense, terrifying, absolutely riveting
film about the ironies of war and the deadly
psychological games enemy...
http://www.flickfilosopher.com/oscars/bestpix/riv...

3. Bridge on the River Kwai Plot
One of "Bridge on the River Kwai" web pages. Part of

Summer Specials!
- Summer Necessities
- Great Getaways!
- Summer Blockbusters

See Movie Reviews by Mr. Showbiz

- Bring It On (PG-13)
  Kirsten Dunst and Eliza Dushku have...
  (77/100)

- The Art of War (R)
  There's definitely no art to Wesley... (29/1

- The Crew (PG-13)
  Geezer goombahs run amok in Miami's...
  (36/100)

More Rev

FIG. 5-C the 'History in Film' web site. Includes plot, outlines, worksheets and screen photos.
http://www.historyinfilm.com/kwai/plot.htm 4. The Bridge On The River Kwai (1957) Great
Memorable Moments from Great Movies! Great
Moments and Scenes from Memorable Movies! Great
Lines and Quotes from the Movies! Great Movies
with Great Dialogue! Great Stars and Great
Characters in Great...
http://www.filmsite.org/bridge.html 5. Bridge on the River Kwai, The
The Bridge on the River Kwai Mark R. Starting with
The Bridge On the River Kwai, I will begin reviewing
"oldies but goodies." As I work in a video store, I
cringe when garbage new...
http://www.projectorbooth.com/reviews/rewind/brid...

Click on the 33 for a chance to win $1,000,000

(33) (88) (16) (78) (52) (9)

Next 10>

Check Out the GO Shop

GO.com          ABC.com            Disney.com      Family.com       Mr. Showbiz
Partners:       ABCNEWS.com        ESPN.com        Movies.com       Wall of Sound GO.com Information: Add a URL   About Our Company   Jobs   Write to Us
GO.com Affiliate Terms of Service
Copyright © 2000 Disney Enterprises, Inc. All Rights Reserved.

FIG. 6-A

☐ Go to MyPage  Sign Out  Privacy/Saf

SEARCH ⦿All ○Images ○Audio/Video bridges

[GO]  ⦿New Search
      ○Within Results

Sea
GOgu

Go Back-To-School!
Who's who on Mr. Showbiz!

GO DIRECTORY

Search>Travel>Vacation ideas>Tourist
attractions>Bridges

Bridges
Covered bridges

Travel Vacations

Find the perfect getaway
 • Beach vacations
 • Find a Resort
 • Disney World Vacations
 • Bed & Breakfast Search More vacations

☐ USER RATED SITES 6 matches    Powered by sort by:

☐ Bridges of Portland, Oregon
Photos and descriptions of the bridges that span the
Columbia and Willamette rivers in Portland, Ore.
Last reviewed by traveler112
http://www.bizave.com/portland/bridges/

☐ Golden Gate Bridges: San Francisco
History, photos and an FAQ about this historic San
Francisco bridge.
Last reviewed by traveler112
http://www.goldengate.org/

☐ Historic Bridges of Oregon
Site offers links to information and photographs of many
of the state's historically significant bridges.
Last reviewed by traveler112
http://www.odot.state.or.us/eshtm/br.htm Got Milk?

milk can cause
digestive
problems in cats

Disney Vacations

Don't give it to your
Cats are sensitive critters
who need a balanced and
healthy diet. Don't kill
with kindness!

• Disney Vacations Home

FIG. 6-B

☐ Royal Gorge Bridge: Colorado
World's highest suspension bridge, spanning the Arkansas River at a height of 1,053 feet. Site includes photos, history and visitor information.
Last reviewed by traveler112
http://royalgorgebridge.com/

☐ Good Bridge News
Information and local news coverage concerning the Ringling Causeway Bridge.
Last reviewed by jbrooks18
http://www.thegoodbridge.com/

Next 1>

☐ WEB SEARCH RESULTS ☒   Powered by: [____]

703,234 matches   Sort by date | Ungroup results

Hide summaries | Sort by date | Ungroup results

1. New Hampshire's Covered Bridges
Complete listing and brief descriptions of all 54 of NH's Covered Bridges.
Relevance 71% Date 9 Jul 1999, Size 9.1K
http://www.nhweb.com/travel_guide/covered_bridges...
Find similar pages | Translate this page 2. DOE Information Bridges
Full-text DOE research and development reports in physics, chemistry, materials, biology, environmental cleanup, energy technologies, and other topics.
Relevance 71% Date 5 Feb 1999, Size 1.1K
http://www.doe.gov/bridge/
Find similar pages | More results | Translate this page 3. Bridge World Home Page
Online home of Bridge World magazine. Includes an

- Walt Disney World Vacations
- Disneyland Vacation
- Disney Cruise Line Vacations
- Disney Theme Park More Disney Save up to 70%!
- Big Deal of the Day
- Electronics
- Bargaineers Club Travel Reservations

- Air
  Book a flight
- Car
  Rent a car
- Hotel
  Reserve a hotel room

Travel Destinations
Where are you going? Find country profiles first choosing a continent.

[Africa ▽]

FIG. 6-C introduction to the game, a practice area, and bridge references.
Relevance 71% Date 22 Apr 1999, Size 4.5K
http://www.bridgeworld.com/
Find similiar pages | More results | Translate this page 4. American Contract Bridge League
Features tournment info, locations of bridge clubs around the world, online bridge play, laws of duplicate bridge, sales catalog, and more.
Relevance 71% Date 4 Oct 1999, Size 8.5K
http://www.acbl.org/
Find similiar pages | More results | Translate this page 5. Bridge Webring
Links to bridge-related sites on the Internet.
Relevance 70% Date 3 Jan 1999, Size 5.8K
http://www3.ns.sympatico.ca/david.positronic/ring
Find similiar pages | Translate this page Travel Resources
- Plan trips with friends
- Get a map
- Buy travel essentials
- Translate a phrase
- Check the weather Look in GO S Next 10>

☒

Check Out the GO Shop

GO.com Partners:

ABC.com        Disney.com        Family.com        Mr. Showbiz
ABCNEWS.com    ESPN.com          Movies.com        Wall of Sound
GO.com Information: Add a URL About Our Company Jobs Write to Us
GO.com Affiliate Terms of Service
Copyright © 2000 The Walt Disney Company, GO.com. All Rights Reserved.

FIG. 7-A

☐ Go to MyPage  Sign Out  Privacy/Saf

SEARCH ⊙All ○Images ○Audio/Video
[loza12]

⊙ New Search
○ Within Results
[GO]

All sports, all the time!
Wanna be a millionaire?

What Do You Want to See Here?
loza12
Welcome! Please help GO.com give you more what you want. Tell us what you are hoping for this search topic.

Tell us here>

☐ USER RATED SITES

Powered by [  ]

There are currently no Go Guides available for this topic.
Become a Go Guide!

Play that funky music!
[☒]

Heavenly music at the Wall of Sound!

And if you can't play, ahead and listen! Check some of these great artists.

- Sting sans The Police
- Blaine loves Led Zeplin
- Goo Goo Dolls- overhyped, but still
- Our own Kristina's from Nine Inch Nails
- Aussie soap opera song Natalie Imbruglia Watch video ☐ WEB SEARCH RESULTS [☒]  Powered by: [  ]

3 matches

Hide summaries | Sort by date | Ungroup results

1. Eagles Game Stats
ESPANOLA SCREAMING EAGLES JUNIOR "A"
HOCKEY THE SCREAM: Eagles Commentaries
Regular tickets Adults $6.00 Student $4.00 SEASON
TICKETS Adult $110.00...
Relevance 30% Date 13 Mar 2000, Size 79.8K
http://www.etown.net/eagles/goal_scored.html
Find similiar pages | Translate this page 2. Programa-9 de Octubre
SABADO 9 DE OCTUBRE 12:00 hrs SALA 3 Camino
a casa Diente de leche. 1999. Javier Patron. 13: 46 min,
Casting. 1999. Nela Fernandez. 15:23 min. Los perros
patinadores. 1999. Fernando Rueda. 13:22min.La...
Relevance 29% Date 23 Feb 2000, Size 19.1K
http://www.givenet.org/cinefest/programa_09.htm
Find similiar pages | More results | Translate this page GO Express Search 3.
Put More Power in Your Search--For Fast Try GO Express Search, a tool that combs to with the power of ten top search engines!

Tell
Download

Relevance 0% Date 29 Aug 2000, Size 5.8K
Find similiar pages | Translate this page

Summer Specials!
- Summer Necessities
- Great Getaways!
- Summer Blockbusters

Next 1>

GO Shopping

Shop for what you want!

- Search for loza12
- Shop by Product
- Utilize the Buyer's Guides
- See Merchant Ratings
- Use GO Shopping's Advance Search Look in GO Shop

GO Split Column Framework

Next 10>

Check Out the GO Shop

GO.com  ABC.com          Disney.com    Family.com      Mr. Showbiz
Partners: ABCNEWS.com    ESPN.com      Movies.com      Wall of Sound
          GO.com Information: Add a URL About Our Company Jobs Write to Us
          GO.com Affiliate Terms of Service
          Copyright © 2000 The Walt Disney Company, GO.com. All Rights Reserved.

FIG. 7-B

FIG. 9
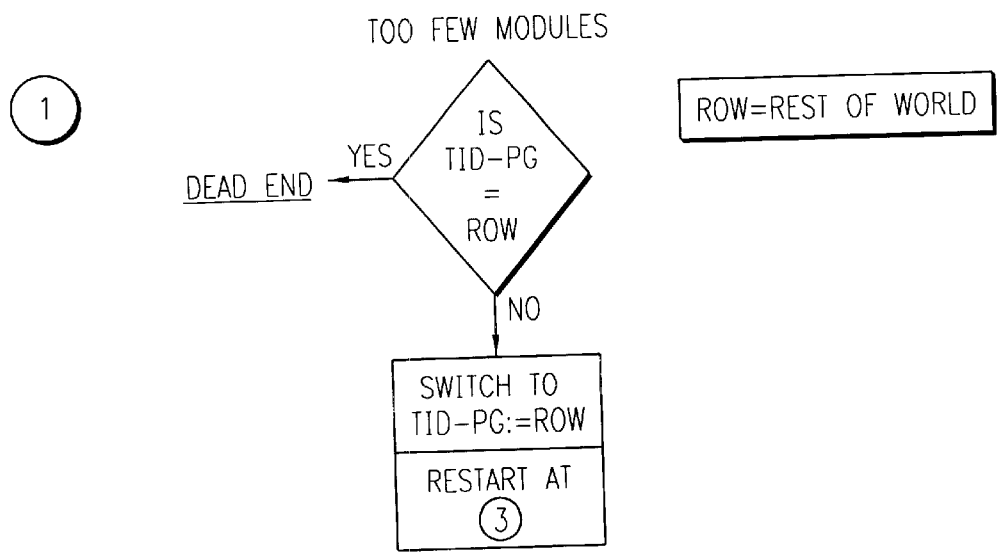
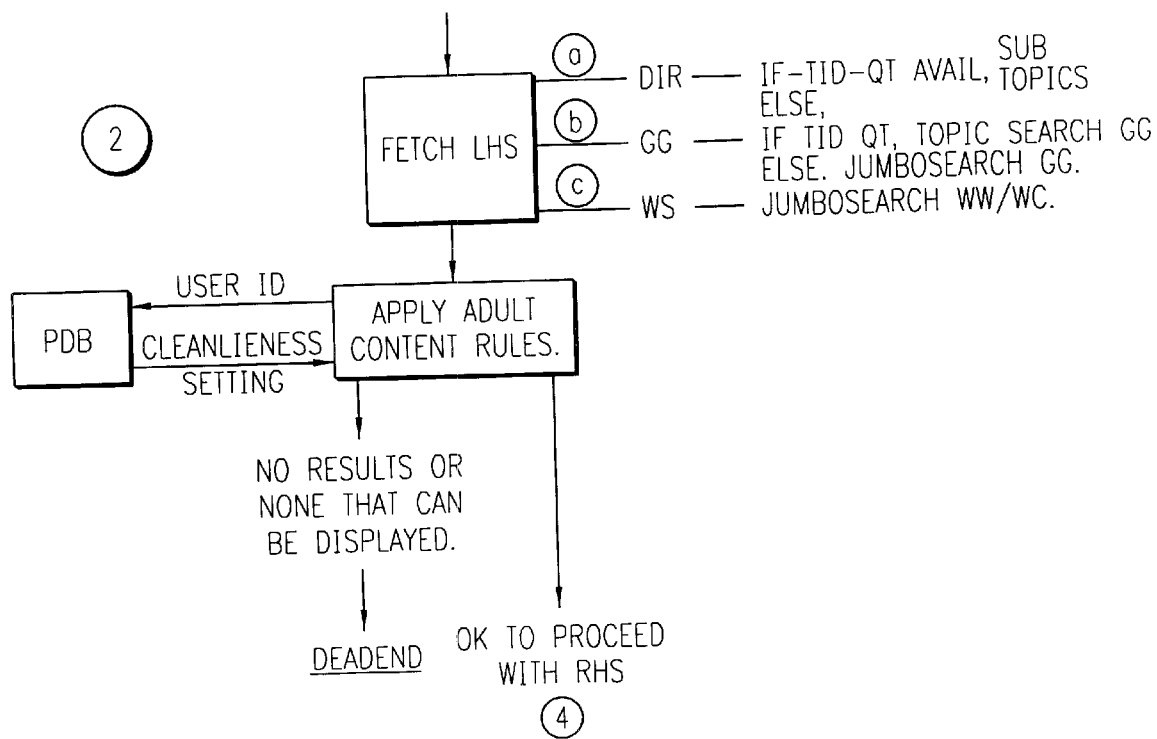

FIG. 11
<u>DEADEND</u>   CAUSE DEPENDENT:
  a) LHS RELATED WARNINGS-SHOW APPROPRIATE ERROR PAGE
      eg. ADULT, 500 HITS, NO GT,
         NO RESULTS IN NEITHER AH OR WS
  b) TOO FEW MODULES-SHOW ONLY LHS PAGE.
( 5 )   <u>OK TO CONSTRUCT PAGE.</u>
(e.g. M83 ⇒ /REAL/ MODULES/FRAGS/ M_00083.FRAG)
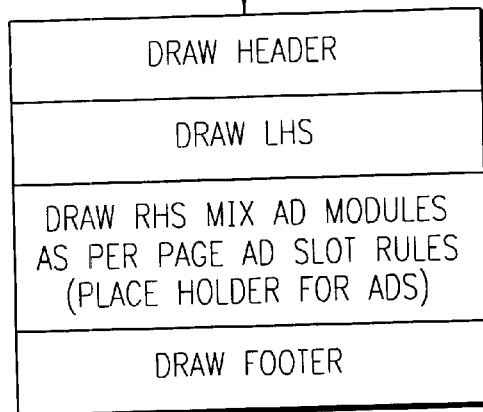
eg. AD TYPE-"BANNER", "TEXT-1", "TEXT-2" "AD MODULE"
    "HALFBANNER"(?), DINE.
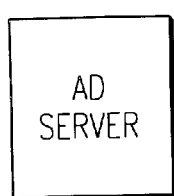

Ⓐ

PAGE DESC

| PAGE TYPE NAME-MEMO | | | | | |
|---|---|---|---|---|---|
| MIN/MAX MODULE RULE | | | | | |
| AD SLOTS-POSITION FRR AD MOD, AD HALF BANNER | | | | | |
| MODULES-MOD | | | | | |
| A | MOD ID | TID OVERRIDE | NAME | MAX RU | MODULE'S BRIAN VIEW NAME |
| B | 163 | TO | M28 | 2 | |
| C | | | | | |
| | (LOOK + CONTENT TYPE) | | (LOOK) | | |
| | (BIO) | | (PIC + 2 LINES) | (HOX GENETIC TO GO) | |

+ TICK URL

Ⓑ = Ⓐ + TICK URL

<u>FOCUS YOUR QUERY</u>  WHEN GIVEN QT
KW RETURNS >1 TID.-QT

USING PREMOTE TOPIC FOR "ONTOLOGY"

FIG. 15

BETTER NAMES:

DMT → DIRECTORY MANAGEMENT TOPIC

BRIAN → CODE NAME FOR ONTOLOGY DB/ARCHITETURE

MAT → MODULE ADMISTRATION TOOL

CDGM → FASTER LOOKUP DATABASE

KEYWORD → MAPPING USER QUERY TO UNIQUE WORD(S)

SP → SERVICE PROVIDER CONTENT PARSER OF CONTENT TO XML

TID → TOPIC ID

QT → USER TYPED TEXT

KW → KEYWORD SERVICE

ROW → REST OF THE WORLD

RDIST → DISTANCE IN THE ONTOLOGY TREE TO FIND CONTENT

PDB → PERSONALIZATION DATA BASE

TICK → TRANFERING INFORMATION
  (a) CHEAPLY AND KWICKLY
  (b) (CONTET CACHEING SERVER)

MERGE → CONTENTMERGE OF DIFFERENT XML TEMPLATED CONTENT.

LHS → LEFT HAND SIDE

RHS → RIGHT HAND SIDE

MODULE → A UNIT OF HTML PRESENTATION.

XS → EXTENDED KEYWORD SERVICE. (ALTERNATIVE LOOKUP TABLE)

SYSTEM AND METHOD FOR SELECTING CONTENT FOR DISPLAYING OVER THE INTERNET BASED UPON SOME USER INPUT

RELATED APPLICATIONS

This application is based on U.S. Provisional Patent Application No. 60/229,779; filed Sep. 1, 2000 and entitled "Method and System for Displaying Content Over the Internet." The contents of which are incorporated herein.

BACKGROUND OF THE INVENTION

1. Field of Invention

This invention relates generally to a system and method for selecting content for displaying over the Internet based upon some user input. Particularly, this invention relates to a system and method of selecting content from a content directory for display in a web-page where the content is based upon some arbitrary user input.

2. Background of the Invention

In recent years, web-pages, and other Internet components have changed to incorporate the popularity of customizable, interactive, and dynamic structure. Most existing web-pages contain pre-specified content, where a user simply downloads the source code of the desired page for viewing in an Internet browser. Some web-pages may have limited dynamic components and may offer limited customizability. For example, existing web pages may allow a user to make certain custom settings to a web-page. However, the user is usually prompted for specific information, and has a limited number of choices. A need still exists for a system and method capable of generating and displaying content in a web-page, based upon some arbitrary input by a user.

3. Summary of the Invention

The invention disclosed herein is a novel approach which addresses many of these limitations. A general feature of the present invention is to provide a system and method for displaying content over the Internet, based upon some arbitrary user input. The content may include, but is not limited to web content such as pictures and/or links and/or functional programs and/or tables and/or charts and/or functions etc.

The present invention provides a method for displaying information from the Internet. In one embodiment, the invention generates a plurality of content modules, each content module comprising a subset of the content of at least one web site. The content modules are then stored in a content module data directory. When a query is received from a user, the query is assigned to at least one content module. The results of the query are displayed on two regions of the user's screen. On a first region of the user's display screen a list of information relating to the plurality of retrieved web sites is displayed. On a second region of said display screen, information from said at least one content module associated with the query is displayed.

One feature of the present invention is to maintain a directory of web-page content modules and to algorithmically traverse the directory, based upon some user input, to synthesize content for a web-page.

A module as used herein may be a discrete chunk of content so that combining one or multiple modules will in effect synthesize part or all of the content of a web page. For example, a user may issue as input the word "dolphins" and the invention will dynamically create a web page with various content modules related to dolphins. The exemplary method of the invention may traverse the directory containing the content modules and obtain modules which exactly correspond to the keyword "dolphins" if such modules exist in the directory. For example, the traversal may obtain content modules with pictures and links to dolphin shows. Alternatively the invention may obtain modules that do not directly correspond to the keyword "dolphins," but are related to keyword, if such modules exist in the directory. For example, the directory traversal may obtain content modules related to marine mammals.

BRIEF DESCRIPTION OF THE DRAWINGS

FIG. 3 discloses a possible resulting web page from user input of "Britney Spears".

FIG. 5 discloses a possible resulting web page from a user selection of "Bridge on the River Kwai, The".

FIG. 6 discloses a possible resulting web page from a input of "bridges".

FIG. 7 discloses a possible resulting web page from a user input of "loza12".

FIG. 9 discloses part of the embodiment represented by FIG. 1; namely, scenarios of the traversal of the data structure 14.

FIG. 11 discloses part of the embodiment represented by FIG. 1; namely additional checks after the content is retrieved 20.

FIG. 15 is a list of acronyms referenced by FIGS. 8–14.

DETAILED DESCRIPTION OF THE INVENTION

This description is not to be taken in a limiting sense, but is made merely for the purpose of illustrating the general principles of the invention. The section titles and overall organization of the present detailed description are for the purpose of convenience only and are not intended to limit the present invention. Accordingly, the invention will be described with respect to a ontology content directory data structure which is a data tree. It is to be understood that the particular data structure described for the ontology directory herein is for illustration only; the invention also applies to other data structures and combinations of other data structures. For example, linked lists, heaps, deaps, hash tables, directories etc. Also, the invention may apply to numerous types of each of these data structures, such as binary search trees, 2–3 trees, 2–3–4 trees, red-black trees, m-way search trees, b-trees, digital search trees, k-dimensional trees, min-max heaps, binomial heaps, f-heaps, etc., individually and/or collectively.

The invention may also be run on multiple computer hardware and software platforms. For example, Intel/AMD based systems, Sun Microsystems, Silicon Graphics, IBM RS/6000, IBM AS/400, Macintosh, Windows, Unix, etc. The invention may also encompass various internet technologies such as Java applets, active servers, xml, html, dynamic html, Active X, Java script, etc. The invention may be written in a number of computer languages, such as, C/C++, Java, Perl, Java script, Lisp, Visual Basics, etc., individually or collectively. The resulting web page may be viewed on various browsers such as Netscape Navigator, Internet Explorer, and/or various document editors such as Microsoft Word, Word Perfect etc.

Displaying Content Over the Internet Based Upon Some User Input

Figure 1:
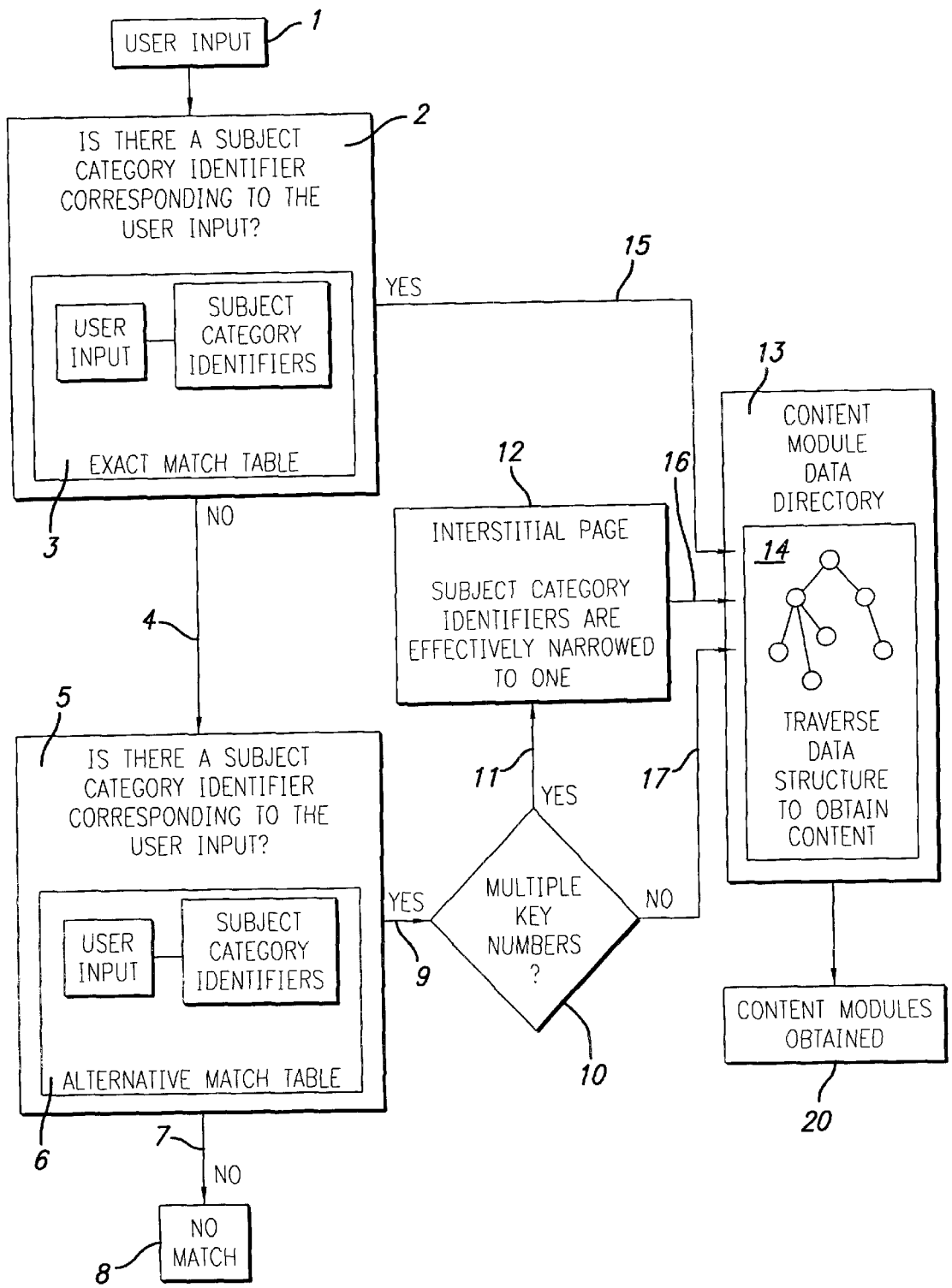
FIG. 1 is an exemplary method diagram in accordance with one embodiment of the present invention, which illustrates by way of example a flow chart that represents a functional algorithm for generating content for display over the Internet based upon some user input.

FIG. 1 illustrates by way of example a flow chart that represents a functional algorithm for generating content for display over the Internet based upon some user input. In this embodiment of the present invention, a user on a client system first sends a query to a server system (1). This query may be any textual input and/or keyword and/or phrase and/or search term etc.

Generating a Subject Category Identifier

Figure 2:
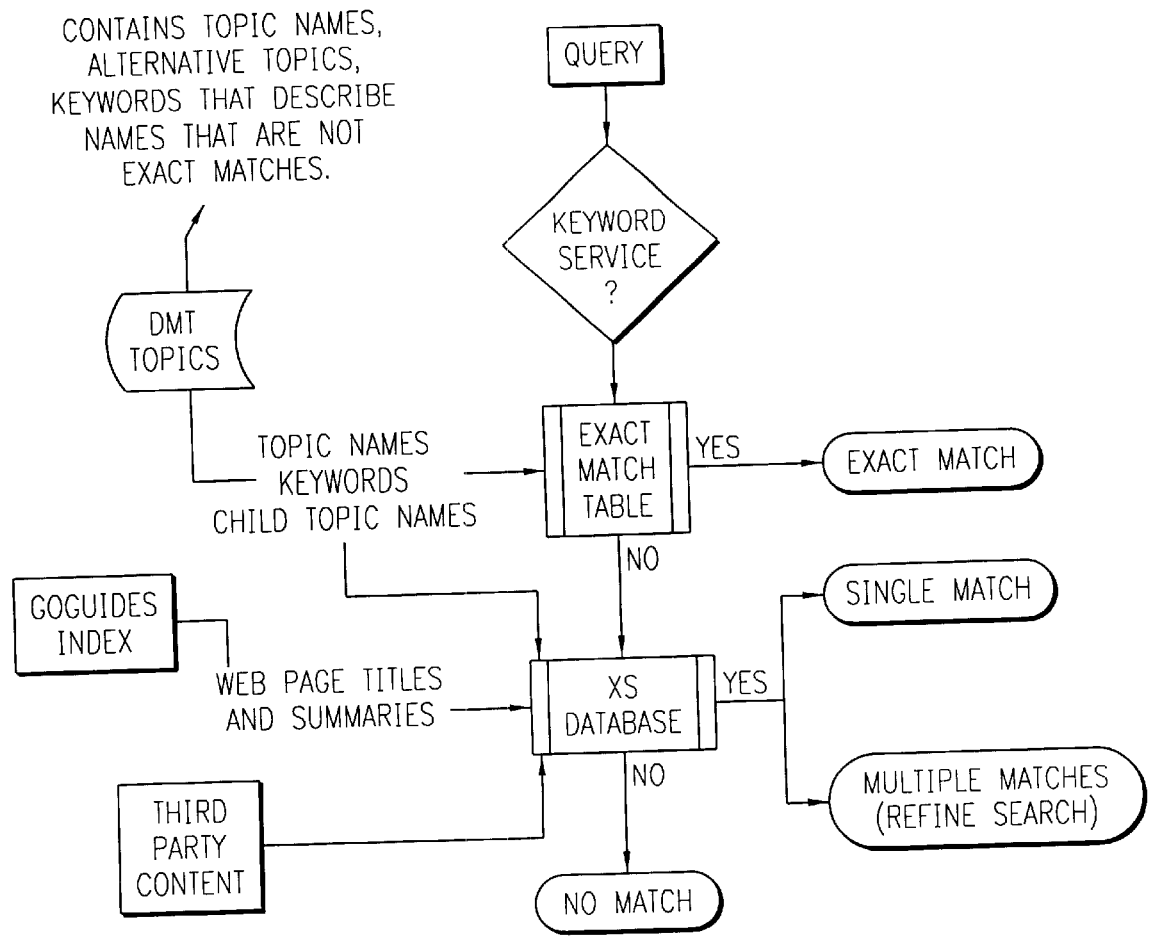
FIG. 2 is an exemplary method diagram in accordance with one embodiment of the present invention, which illustrates by way of example a flow chart that represents a functional algorithm for generating identification numbers for associating with nodes in a data directory.

The query is then algorithmically associated with a subject category identifier (shown in steps 1–12). In general, there may be four possible outcomes of the first pass of the algorithm: first, a single subject category identifier is obtained which is an exact match to the user input (15); second, a single subject category identifier is obtained which is an alternative match to the user input (17); third, multiple subject category identifiers are obtained which are alternative matches to the user input and the algorithm narrows the subject category identifiers to one (16); fourth no subject category identifier is found (7). FIG. 2 discloses another embodiment of generating the subject category identifiers (15, 16, 17, 7 on FIG. 1).

Subject category identifiers associated with user input may be stored in two different tables; namely, an exact match table (3) or an alternative table (6). First, the algorithm checks the exact match table (2, 3) to determine if there is a subject category identifier that corresponds to the query. The subject category identifiers in the exact match table correspond to nodes in the content module data directory (13) directly relating to the user input. For example, if the user input is "dolphins" and the algorithm obtains a subject category identifier in the exact match table (3), the respective node in the data directory (13) associated with that subject category identifier may contain a content module directly relating to dolphins. Furthermore a subject category identifier obtained from the exact match table (3) may indicate the starting node point for traversing the content module directory (14) and determine the algorithm for traversing the data directory for additional content modules. If no corresponding subject category identifier is found in the exact match table for some user input (4), the algorithm checks the alternative table to determine a subject category identifier that corresponds to the query (5, 6). If a single subject category identifier in the alternative table is found associated with the user input (9, 10, 17), then this subject category identifier is used for the directory traversal for obtaining content modules (14). The subject category identifiers in the alternative match table correspond to nodes in the content module data directory (13) relating to the user input and may indicate the starting node point for traversing the content module directory (14) and determine the algorithm for traversing the data directory for additional content modules. If a plurality of subject category identifiers are found (9, 10, 11) associated with the user input the algorithm may provide the user a choice of different query options to narrow the subject category identifiers to one (12). After the user makes a selection from the given choices, the algorithm selects the single subject category identifier (16). It is also possible that the algorithm not find a subject category identifier (7, 8) in either the exact match table or the alternative match table. In this case, the directory of content modules is not traversed.

Directory of Content Modules

A directory of content is maintained on the server system in a data structure such as a data tree which can be traversed (13). The content information may be stored in a variety of data structures known to one skilled in the art or methods developed in the future. An algorithmic traversal is then performed on the data structure based upon the subject category identifier generated from the query (14), in order to determine content for displaying (20). The data structure may be a data tree wherein each tree node contains pointer(s) to web content modules and each node is associated with a subject category identifier. The data tree may be hierarchically arranged so that the specificity of the web content module referenced by the node is a subset of the more general web content module referenced by the parent node. As an example, a node, associated with a subject category identifier, may be associated with mammals, and may contain a pointer to a web content module relating to mammals. The children node(s) of that node, also associated with subject category identifiers, may be associated with particular mammals, and may contain pointers to web content modules relating to those specific mammals such as dolphins or elephants. The children node(s) of the dolphin, for example, also associated with a subject category identifier, may be associated with a particular type of dolphin and may contain a pointer to a web content module relating to that particular type of dolphin. This type of data arrangement is just one method of maintaining the web content module directory. The data structure can be a collection of multiple data structures, and these data structures can be separated and/or merged. An arbitrary number of web content modules can be used in order to collectively provide content for a web page. The traversal may start at a particular node, wherein the node's number is equal to the subject category identifier generated from the query. The traversal may move up or down the data directory, depending upon how the subject category identifier was generated (15, 16, 17), in order to obtain content modules related to the query. For example, if the user input "dolphins" generated a subject category identifier from the exact match table (15), the algorithm may first use the content module referenced by the node corresponding to that subject category identifier, and then traverse down the data tree to obtain more specific content modules. If, on the other hand, the user input "dolphins" generated a subject category identifier from the alternative match table (16 or 17), the algorithm may first use the content module referenced by the node corresponding to that subject category identifier, and then traverse up the tree to obtain more general content modules. The web page is finally synthesized with the content modules obtained in the process outlined by FIG. 1.

FIG. 2 is an exemplary method diagram in accordance with one embodiment of the present invention, which illustrates by way of example a flow chart that represents a functional algorithm for generating identification numbers for associating with nodes in a data directory.

Figure 4:
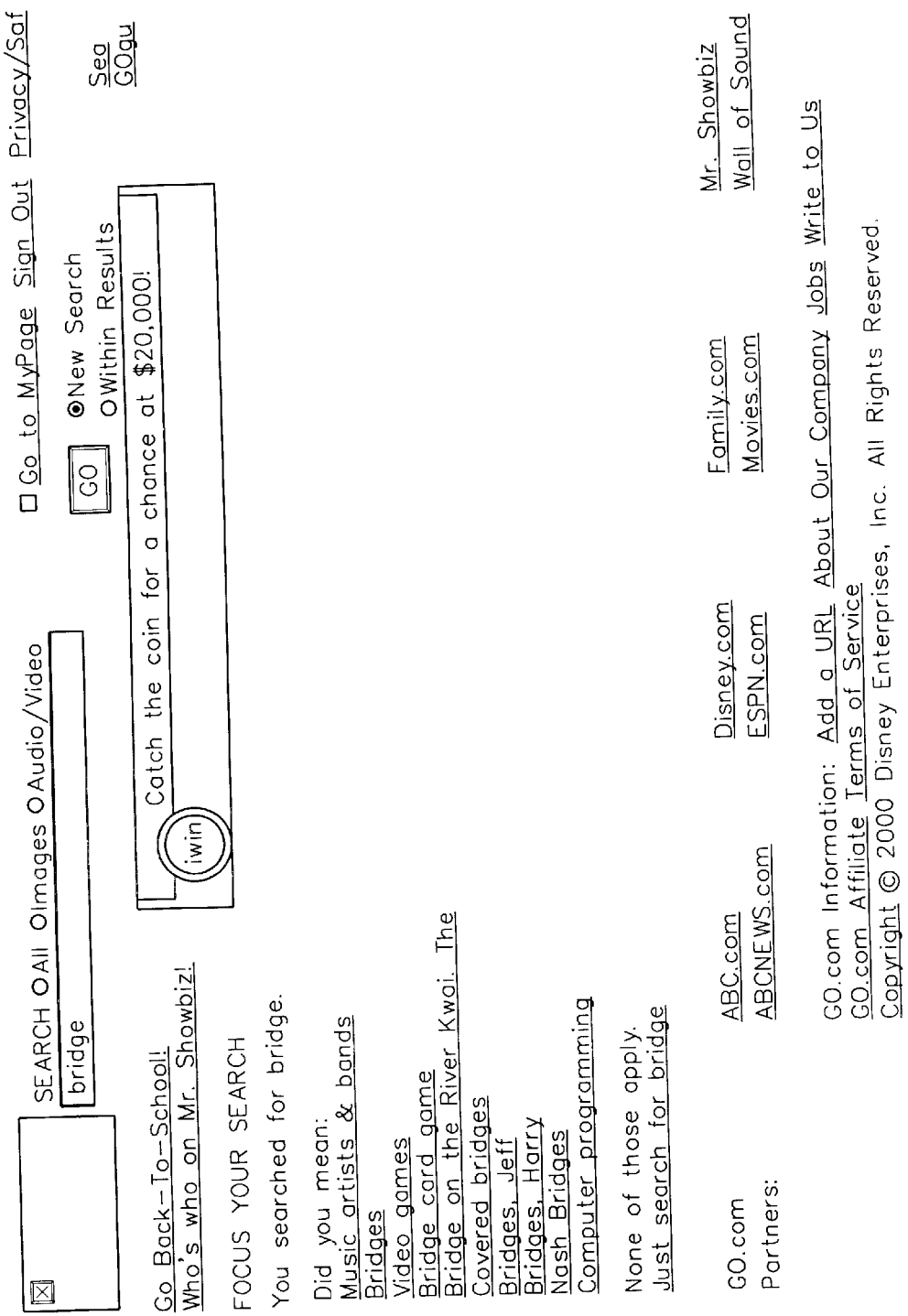
FIG. 4 discloses a possible resulting web page from user input of "bridge".
Figure 8:
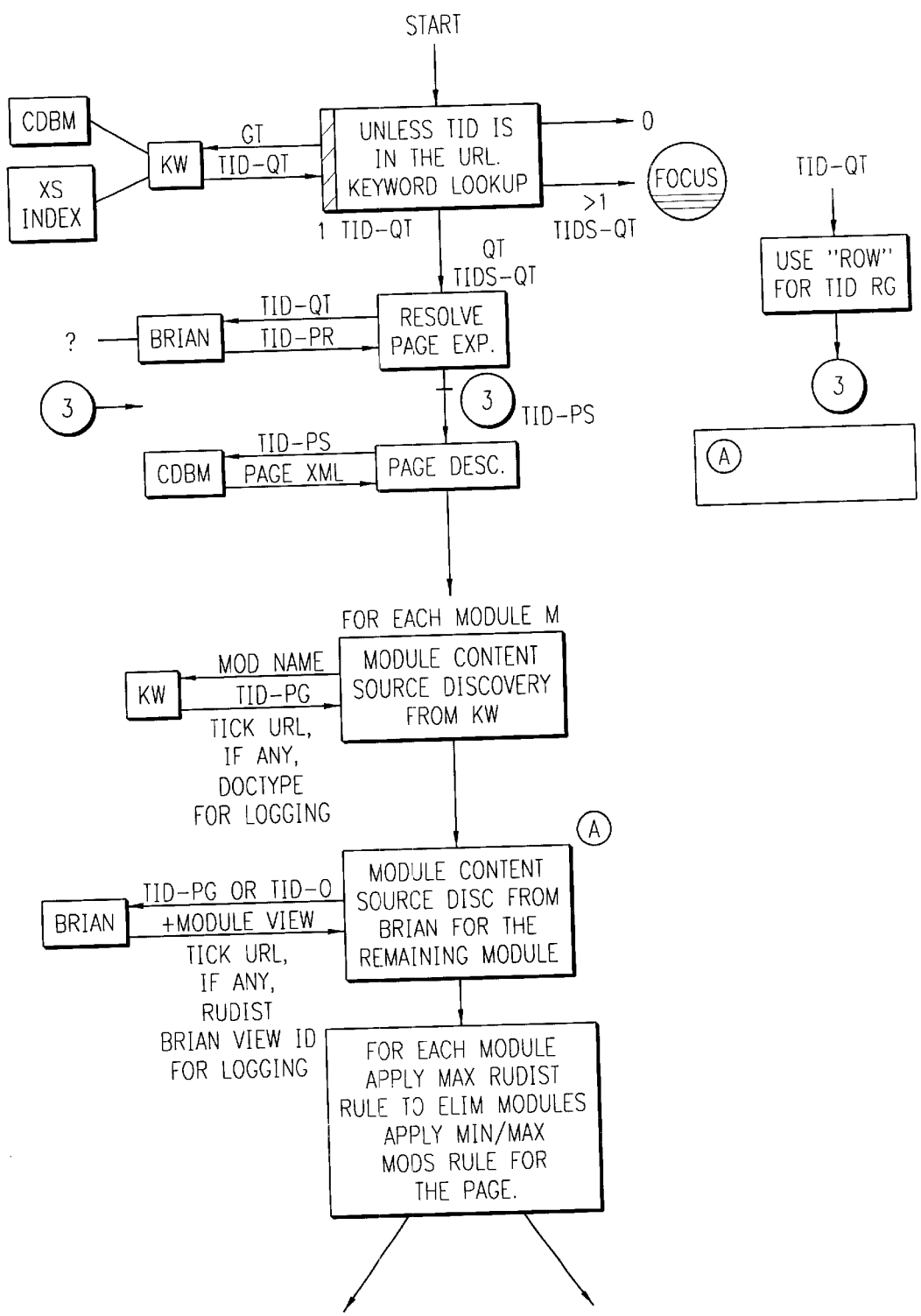
FIG. 8 discloses part of the embodiment represented by FIG. 1; namely a detailed description of the communication channels 1–17.
Figure 10:
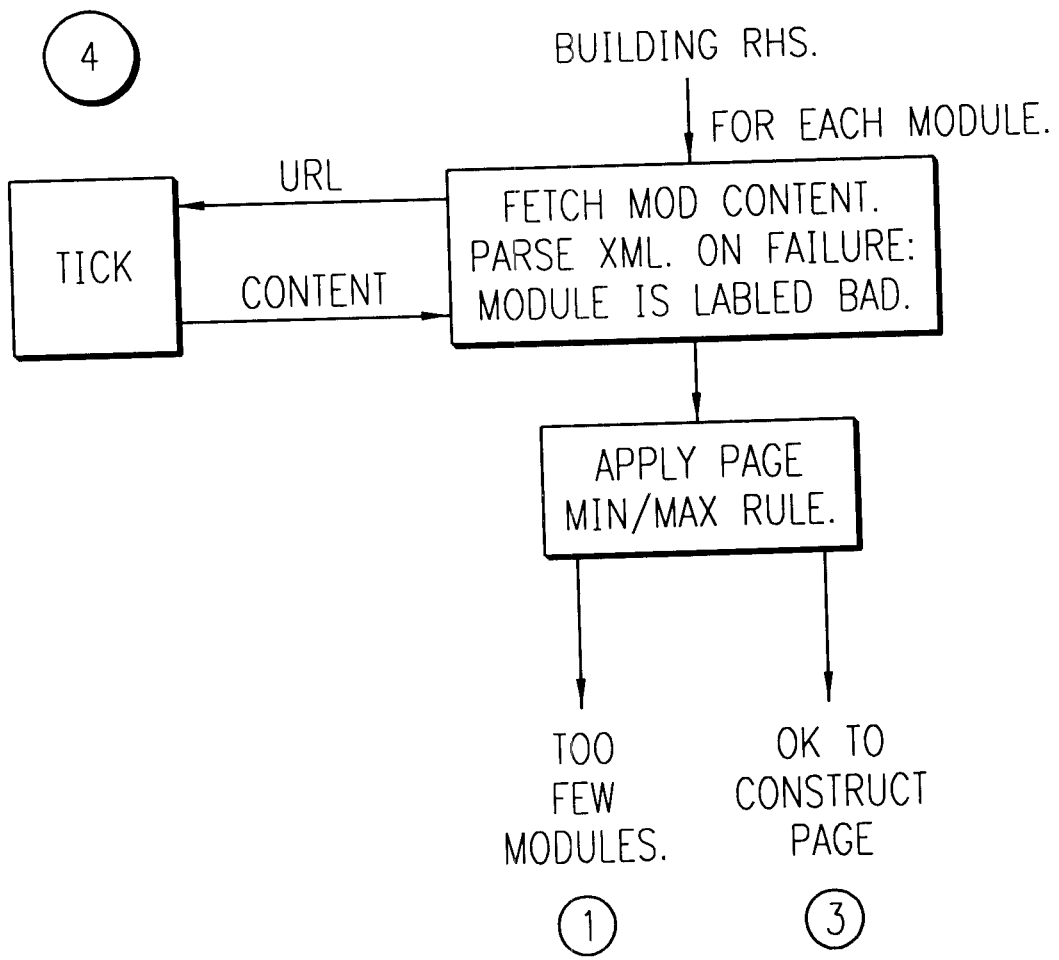
FIG. 10 discloses part of the embodiment represented by FIG. 1; namely obtaining content from each node during the traversal 14.
Figure 12:
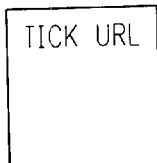
FIG. 12 discloses the format of the page description.
Figure 13:
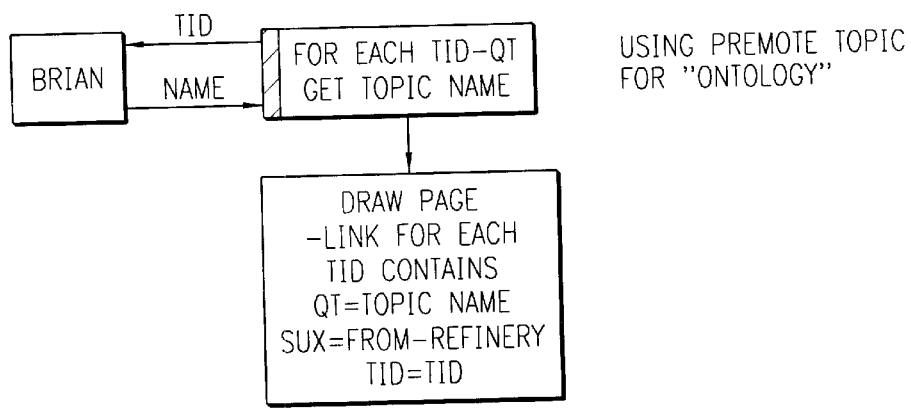
FIG. 13 discloses part of the embodiment represented by FIG. 1; namely the interstitial page 12.
Figure 14:
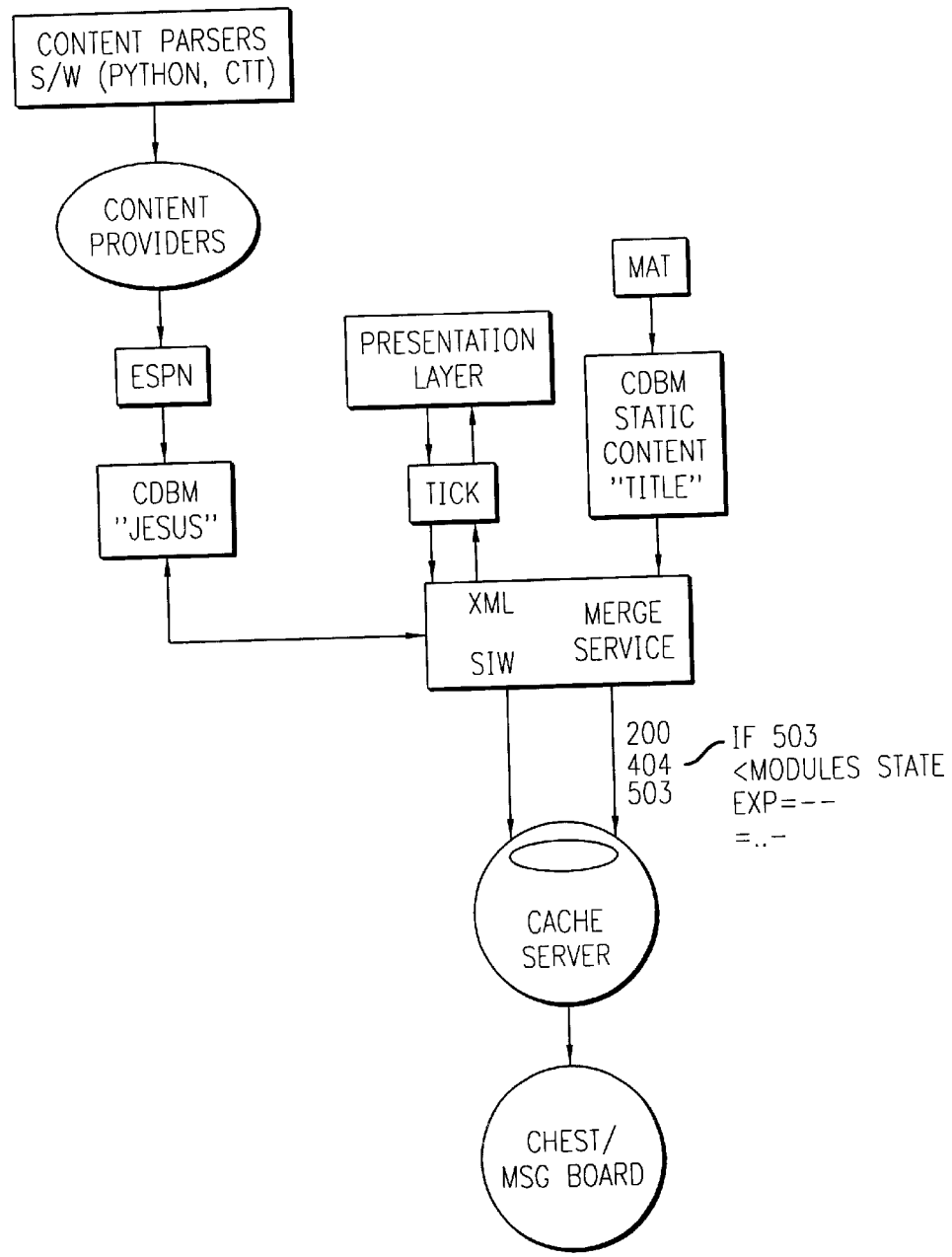
FIG. 14 discloses part of the embodiment represented by FIG. 1; namely the data structure 14.

FIG. 3 discloses the resulting web page from a subject category identifier obtained from the exact match table (15) from a query for "Britney Spears". FIG. 4 discloses the resulting web page from multiple subject category identifiers obtained (11) from the alternative match table from a query for "bridge" wherein no content modules are obtained and the user is given a choice of different query options (12). FIG. 5 discloses the resulting web page from a subject category identifier obtained (16) after the user selects "Bridge on the River Kwai, The" from the interstitial page (12) represented by FIG. 4. FIG. 6 discloses the resulting web page from a single subject category identifier obtained from the alternative match table (17) from a query for "bridges". FIG. 7 discloses the resulting web page from no match (7, 8) from a query for "loza12". FIGS. 8–14 disclose additional details of processes for implementing the embodiment of the invention shown in FIG. 1.

What is claimed is:

1. A method for displaying information comprising:
   generating a plurality of content modules, each content module comprising a subset of the content of a web site;
   storing the content modules in a content module data directory;
   maintaining a database of subject category identifiers, each subject category identifier corresponding to at least one content module in the content module data directory; wherein the database of subject category identifiers comprises at least an exact match table and an alternative match table;
   receiving a query from a user;
   retrieving a plurality of URL's of web sites containing content pertaining to the query;
   matching the query to at least one subject category identifier; the matching step comprising the step of determining that an exact match exists between the query and a subject category identifier in the exact match table;
   obtaining at least one content module from the content module directory associated with the subject category identifier; and
   displaying information relating to the plurality of retrieved web sites and information from said plurality of content modules on a display screen.

2. A method for displaying information comprising:
   generating a plurality of content modules, each content module comprising a subset of the content of a web site;
   storing the content modules in a content module data directory;
   maintaining a database of subject category identifiers, each subject category identifier corresponding to at least one content module in the content module data directory, wherein the database of subject category identifiers comprises at least an exact match table and an alternative match table;
   receiving a query from a user;
   retrieving a plurality of TJRL's of web sites containing content pertaining to the query;
   matching the query to at least one subject category identifier; the matching step determining that no exact match exists between the query and a subject category identifier in the exact match table and further determining that a match exists in an alternative match table which associates each user input with at least one key;
   obtaining the at least one content modules from the content module directory associated with the subject category identifier; and
   displaying information relating to the plurality of retrieved web sites and information from said plurality of content modules on a display screen.

3. A method according to claim 2, wherein subject category identifiers in the alternative match table determine an algorithm for identifying content modules in the content module directory associated with the query.

4. A method according to claim 2 wherein if the alternative match table cannot associate a query with a single subject category identifier, then providing the user with a plurality of choices such that the selection of one of said choices serves to permit the alternative match table to associate the user input with a single subject category identifier.

5. A method for displaying information comprising:
   generating a plurality of content modules, each content module comprising a subset of the content of a web site;
   storing the content modules in a content module data directory
   maintaining a database of subject category identifiers, each subject category identifier corresponding to at least one content module in the content module data directory, wherein the database of subject category identifiers comprises at least an exact match table and an alternative match table;
   receiving a query from a user;
   retrieving a plurality of URL's of web sites containing content pertaining to the query;
   matching the query to at least one subject category identifier;
   obtaining the at least one content module from the content module directory associated with the subject category identifier;
   traversing the content directory, wherein the subject category identifier specifies a particular algorithm used to traverse the content module directory; and
   displaying information relating to the plurality of retrieved web sites and information from said plurality of content modules on a display screen.

6. A method for displaying information comprising:
   generating a plurality of content modules, each content module comprising a subset of the content of a web site;
   storing the content modules in a content module data directory;
   maintaining a database of subject category identifiers, each subject category identifier corresponding to at least one content module in the content module data directory, wherein the database of subject category identifiers comprises at least an exact match table and an alternative match table;
   receiving a query from a user;
   retrieving a plurality of URL's of web sites containing content pertaining to the query;
   matching the query to at least one subject category identifier;
   obtaining the at least one content modules from the content module directory associated with the subject category identifier; and displaying information relating to the plurality of retrieved web sites and information from said at least one content module on a display screen to the user.

7. A method according to claim 6, wherein said information is displayed on the first and second regions of the display screen in response to a single input from the user.

8. A method according to claim 6 wherein the content module directory comprises a data stricture having nodes, and wherein each node is associated with one or more subject category identifiers.

* * * * *

UNITED STATES PATENT AND TRADEMARK OFFICE
CERTIFICATE OF CORRECTION

PATENT NO. : 6,728,705 B2
DATED : April 27, 2004
INVENTOR(S) : Licon et al.

It is certified that error appears in the above-identified patent and that said Letters Patent is hereby corrected as shown below:

Column 2,
Line 8, please insert the word -- the -- after the word "to", to read -- related to the keyword --.
Line 63, please delete the letter "a", and replace with the word -- an --.

Column 5,
Line 64, please delete the word "TJRL's," and replace with the word -- URL's --.

Column 6,
Line 65, please delete the letter "s" from the word "modules".

Column 8,
Please delete the word "stricture", and replace with the word -- structure --.

Signed and Sealed this

Twentieth Day of July, 2004

JON W. DUDAS
*Acting Director of the United States Patent and Trademark Office*